United States Patent [19]
Pape et al.

[11] 4,394,068
[45] Jul. 19, 1983

[54] FLUORESCENTLY ACTIVATED DISPLAY DEVICE WITH IMPROVED SENSITIVITY

[75] Inventors: Heinz Pape; Ferdinand Quella; Hans Krueger, all of Munich, Fed. Rep. of Germany

[73] Assignee: Siemens Aktiengesellschaft, Berlin & Munich, Fed. Rep. of Germany

[21] Appl. No.: 121,372

[22] Filed: Feb. 14, 1980

[30] Foreign Application Priority Data

Mar. 20, 1979 [DE] Fed. Rep. of Germany ....... 2910952

[51] Int. Cl.³ .......................... G02F 1/133; G02F 1/19
[52] U.S. Cl. ................................ 350/345; 350/350 F; 350/356; 350/357; 350/362
[58] Field of Search ............... 350/338, 345, 356, 357, 350/362

[56] References Cited

U.S. PATENT DOCUMENTS

| | | | |
|---|---|---|---|
| 3,743,382 | 7/1973 | Rosenberg . | |
| 3,998,525 | 12/1976 | Giglia | 350/357 |
| 4,113,360 | 9/1978 | Baur et al. | 350/345 |
| 4,142,781 | 3/1979 | Baur et al. | 350/345 |
| 4,236,791 | 12/1980 | Krueger et al. . | |
| 4,240,717 | 12/1980 | Camlibel et al. . | |
| 4,264,147 | 4/1981 | Baur et al. | 350/345 |

FOREIGN PATENT DOCUMENTS 2724748 12/1978 Fed. Rep. of Germany .

*Primary Examiner*—Vincent P. McGraw
*Attorney, Agent, or Firm*—Hill, Van Santen, Steadman, Chiara & Simpson

[57] ABSTRACT

An electro-optical display device has a fluorescently activated plate disposed in front of a passive display in the line of sight of a viewer. The entire surface of the fluorescently activated plate is uncovered and is available for collecting ambient light to provide an image of increased intensity and allowing the device to be utilized in environments having low optical radiation levels. The fluorescently activated plate has exit windows thereon for retransmitting the light as controlled by the switchable regions of the passive display in a designated pattern to a viewer.

40 Claims, 7 Drawing Figures

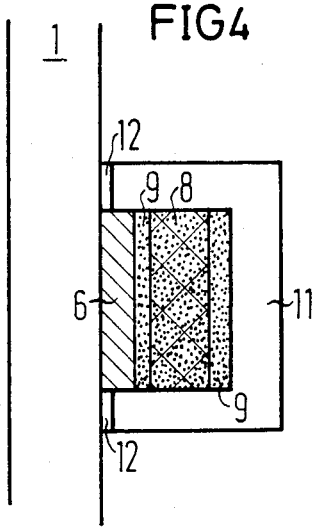
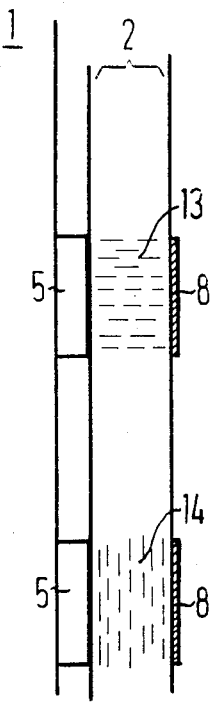
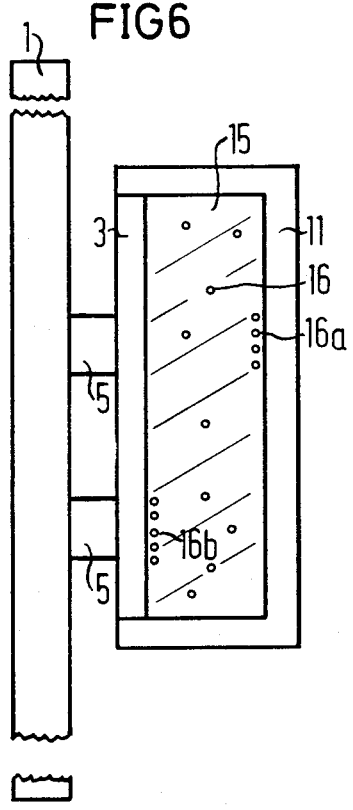
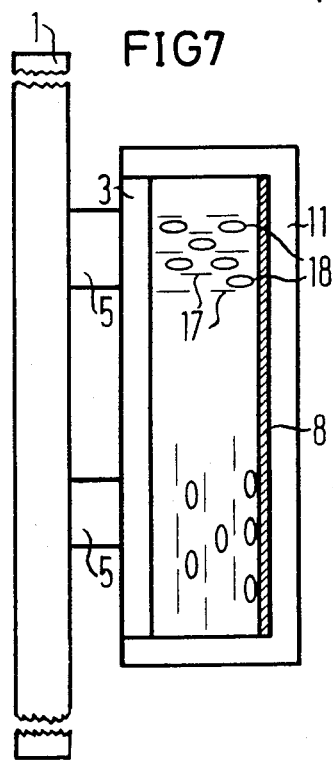

FLUORESCENTLY ACTIVATED DISPLAY DEVICE WITH IMPROVED SENSITIVITY

BACKGROUND OF THE INVENTION

1. Field of the Invention

The present invention relates to electro-optical display devices, and in particular to such devices utilizing a fluoroescently activated plate to collect ambient light and at least one light valve to control transmission of the collected light to a viewer.

2. Description of the Prior Art

Passive optical display devices which are incapable of generating light but which collect and modulate and retransmit the light radiation of the environment in which the display is situated are known in the art. Such devices must be supplied with an external illumination source if it is necessary that the devices provide a display at a visually detectable level under unfavorable light intensity conditions. The use of such external light sources significantly detracts from one of the greatest advantages of such devices, namely the ability to operate at extremely low power input levels. It has thus been a long-standing problem in the art to provide a display device which has a visually detectable output even under unfavorable light input intensity conditions, without significant increase in power consumption.

One solution to this problem has been the development of the so-called "fluorescently activated display" or FLAD. Such devices utilize a fluorescent plate which is located behind a light valve, with the light valve controllable for switching between light transmissive and light blocking states. By appropriate arrangement of switching regions in a light valve which has a surface area coextensive with that of the fluorescent plate, a number of designated patterns can be transmitted to a viewer, with a common application being the representation of digits or numerals in the conventional seven segment configuration.

The fluorescent plate utilized in such devices contains a suitable fluorescent substance therein and is mirrored on its four edges and has indentations or grooves on one surface thereof which is flush with one of the switchable light valve regions. The fluorescent plate collects a large portion of the ambient light which impinges upon the plate and by means of fluorescent scattering and the subsequent reflections from the internally mirrored edges, guides the collected visual radiation and couples it with increased intensity through the indentations. The pattern of the indentations can thus be utilized to transmit information by appropriate transmission and blocking of portions of the pattern by the controlled switching of the light valves.

The light intensity amplification factor of conventional fluorescent plates is given in a first approximation by the ratio of the light collecting plate surface to the light exiting plate surfaces. Further details of the construction and operation of such display devices is found in U.S. Pat. No. 4,142,781 issued to Baur and Greubel.

A problem with the conventional utilization of fluorescently activated devices as described above is that because the fluorescent plate is partially covered by the light valve the plate exhibits only a relatively small collector surface and the efficiency thereof is lessened. Further, some light valves utilized in combination with fluorescent plates operate by polarizing the light transmitted therethrough, thus further decreasing the intensity of the light exiting from the light valves. In general, conventional electro-optical display devices utilizing a fluorescently activated structure have an efficiency of approximately 30%.

SUMMARY OF THE INVENTION

In accordance with the principles of the present invention an electro-optical display device utilizing a fluorescently activated plate achieves increased sensitivity and increased display intensity by disposing the fluorescently activated plate between a viewer and the passive display, which, in contrast to the display of U.S. Pat. No. 4,142,781, is not switched between a light transmissive and a light blocking state but between light reflective and light absorbing states, thereby allowing substantially the entire surface of the fluorescent plate to be utilized as a collector. This is in contrast to conventional display devices utilizing fluorescent plates in which the fluorescent plate is disposed behind the light valve, as seen by a viewer. The conventional arrangement of the plate and light valve is such as to substantially lessen the amount of surface area on the plate available to collect ambient light and thus diminishes the intensity of the light which is eventually transmitted through the light valves to a viewer. This increased intensity is moreover achieved without any increase in power consumption by the device.

It is accordingly an object of the present invention to provide an electro-optical display device with increased sensitivity and increased display intensity, and further to provide such a device which achieves such increases without any increase in power consumption.

This object can be inventively achieved in a structure able to be utilized in combination with known passive display devices such as liquid crystal, electrophoretic and electrochromic devices.

The object is inventively achieved in a device consisting of a fluorescent plate comprised of fluorescent material having an index of refraction greater than one which collects impinging light radiation over substantially its entire surface and directs the collected radiation to a passive display containing switchable regions which are electronically controllable for switching between an absorbing state and a reflective state. The passive display is located, in the line of sight of a viewer, behind the fluorescent plate so that substantially the entire surface of the fluorescent plate remains uncovered. Light which is collected by the fluorescent plate illuminates the switchable regions of the passive display only at designated coupling regions which may be arranged in any pattern suitable to convey information.

Further advantages and uses of the device disclosed herein will be apparent from the following description with reference to the drawings.

BRIEF DESCRIPTION OF THE DRAWINGS

FIG. 4 is a sectional view of an electro-optical device constructed in accordance with the principles of the present invention utilizing an electrochrome display contained in an individual housing.

FIG. 5 is a sectional view of an electro-optical device constructed in accordance with the principles of the present invention utilizing a passive display consisting of magnetically or electrically oriented dipoles.

FIG. 6 is a sectional view of an electro-optical device constructed in accordance with the principles of the present invention utilizing an electrophoretic passive display.

FIG. 7 is a sectional view of an electro-optical display device constructed in accordance with the principles of the present invention utilizing a liquid crystal passive display impregnated with pleochroic dyes.

DESCRIPTION OF THE PREFERRED EMBODIMENTS

Figure 1:
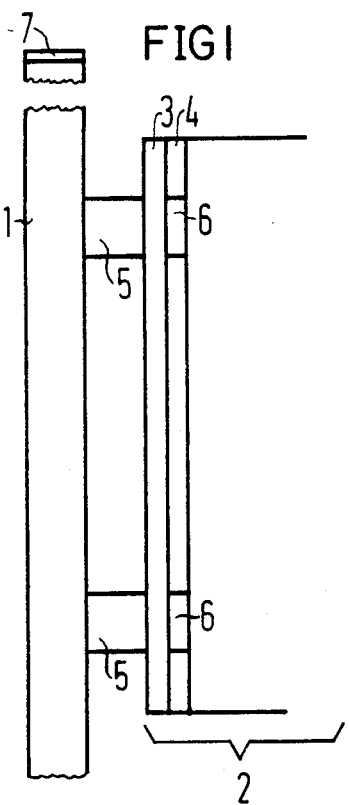
FIG. 1 is a side elevational view of an electro-optical display device constructed in accordance with the principles of the present invention utilizing an electrochromic passive display.

An opto-electrical display device constructed in accordance with the principles of the present invention is shown in FIG. 1 consisting of a fluorescent plate 1 disposed in front of and generally parallel to a passive display device 2. The passive display device 2 may, for example, be an electrochrome display consisting of a transparent carrier 3 and an electrochromic layer 4. A number of flat, elevations 5 are attached to the transparent carrier 3 in registry with an equal number of reversible zones 6 in the electrochromic layer 4. In the case of liquid electrochrome displays, the electrolyte may be directly attached to the electrochrome layer 4, and may have a diffuse scatterer mixed therewith. The device of FIG. 1 terminates in the rear with a back electrode (not shown).

The fluorescent plate 1 is provided with mirrored edges 7 which internally reflect light radiation impinging on the outer surface of the plate 1.

Figure 2:
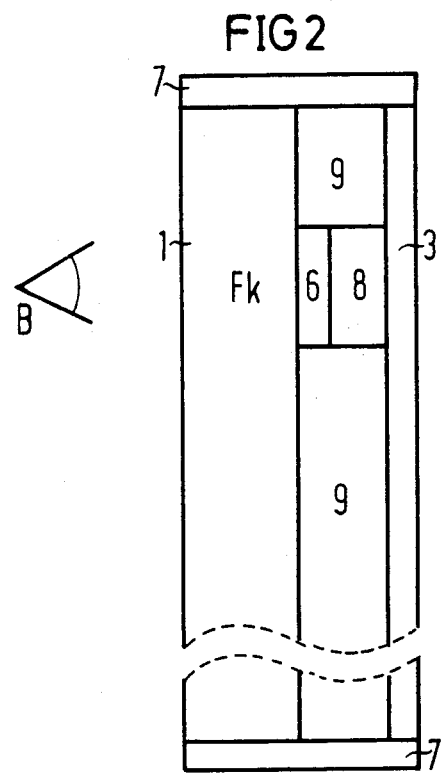
FIG. 2 is a sectional view of an electro-optical display device constructed in accordance with the principles of the present invention utilizing an electrochrome display in which the fluorescent plate is constructed as a unit with the display.

As shown in FIG. 2, the inventive concept herein of placing the fluorescent plate in front of the passive display conveniently allows construction of the display device in a single unit. In FIG. 2, as in all other Figs., the same reference numerals are utilized to identify elements which are identical in each drawing. In FIG. 2, the fluorescent plate 1 is constructed in a single unit with an electrochromic display having a transparent carrier 3 and a reversible zone 6. The electrolyte is referenced at 9 and a diffuse scatterer is referenced at 8 which may, for example, be comprised of felt material. The mirrored edges 7 extend along the entire thickness of the unit shown in FIG. 2. A viewer is represented at B with the fluorescent plate 1 disposed between the viewer B and the reversible zone 6.

In the embodiment of FIG. 2, best forward coupling of images to the viewer B is achieved when the thickness of the fluorescent plate 1 is greater than the thickness of the transparent carrier 3. For example, the fluorescent plate 1 may be 2 mm and the transparent carrier 3 may be 0.5 mm.

Figure 3:
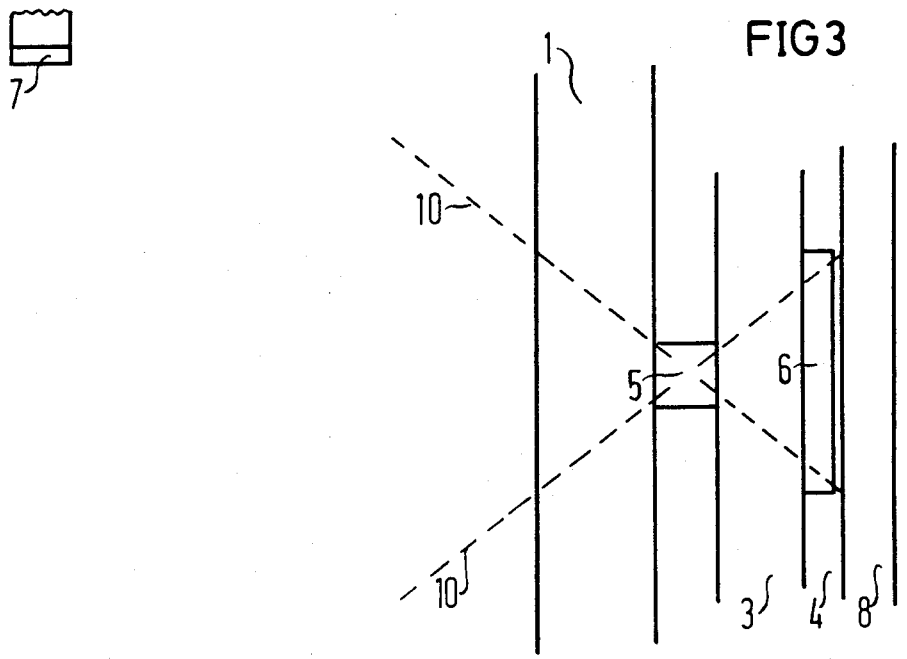
FIG. 3 is an enlarged sectional view of an electrochrome display showing parallax effects.

In FIG. 3, the parallax effects of viewing an image through the couplers 5 is illustrated by the dashed lines 10 representing emitted light. As shown in FIG. 3, it is necessary that the reversible zone 6 be of a greater diameter than the optical coupler 5 in order to compensate for the parallax effects. Although this size relationship is not precisely shown in the other Figs., it will be understood that the relative sizes of the coupler 5 with respect to the light emitting areas, such as the reversible zone 6, in the passive display could be embodied therein. The precise difference in diameters may be varied according to the particular employment of the display device, with the maximum angle at which accurate viewing can be achieved varying according to the difference selected.

In all Figs., it will be understood that the fluorescent plate 1 is provided with light exit windows like the elevations 5 or other suitable markings to result in a pre-selected pattern of emission of fluorescent light onto the switchable regions of the passive display, where this light will be absorbed or reflected in the direction of the viewer according to whether a display region is switched in an absorbing or reflecting state. The optical couplers 5 must have optical contact to the fluorescent plate 1 in order to interrupt the light guiding properties of the plate one in selected regions and allow light exit and reentry of the reflected light from the display which then penetrates the plate 1 in direction to the viewer. The optical couplers 5 must not necessarily be in direct contact to the display device, but usually they are. In general the reflective state is realized by a diffuse scatterer.

A variant of an electrochromic display is shown in FIG. 4 in which each display element consists of an individual electrochromic display, wherein the reversible zone 6 is flush adjacent the fluorescent body 1. Again, the electrolyte is referenced at 9 and a scatterer such as felt is shown at 8. The display element is individually contained in a housing 11 which has control electrodes (not shown) attached thereto. The contact surfaces 12 between the fluorescent plate 1 and the housing 11 are mirrored.

Use of the inventive concept herein with a passive display consisting of electrically or magnetically oriented dipoles is shown in FIG. 5 with the dipoles oriented in a transmissive state referenced at 13 and in a reflective or absorbing state 14. Again, the transmission of light to and from the display 2 in FIG. 5 is effected through the fluorescent plate 1 by means of couplers 5 in registry with the switchable areas 13 and 14.

Another utilization of the concept of a fluorescent plate disposed in front of a passive display is shown in FIG. 6 wherein the plate 1 is disposed in front of an electrophoretic display. The electrophoretic display has a light absorbing carrier liquid 15 in which diffuse reflecting particles 16 are suspended which are continuously electrostatically charged. The particles designated at 16a are shown in an absorbing state of the display preventing light emission to the viewer, while those particles designated at 16b are in a diffuse reflective state directing light to the viewer. The liquid 15 and particles 16 are contained in a housing 11 with a transparent layer 3 comprising the side thereof closest to the fluorescent plate 1.

A liquid crystal display utilizing a fluorescent plate 1 disposed between a viewer and the display is shown in FIG. 7. The liquid crystals are schematically designated at 17 in schematically represented reflective and absorbing states of the passive display, each associated with a coupler 5. Again, the display is contained in a housing 11 with a transparent wall 3. A pleochroic dye designated at 18 may also be employed to effect a color change upon a switching of the liquid crystals.

The inventive concept common to each embodiment shown in the drawings is collection of light radiation falling on the fluorescent plate 1, and illuminating a display region which can be electronically controlled, and retransmission of the light emitted from the display region through the fluorescent plate 1 to a viewer.

The above configuration results in improved intensity and sensitivity of the display device without the use of mechanically movable parts or polarizers. The light collecting area is equal to the surface area of the fluorescent plate 1, because the means for controlling the coupling of light out of the device results in no screening of the fluorescent plate as is the case in conventional display devices utilizing fluorescently activated displays.

The illumination of the displays can be achieved in two manners, the first being by means of a direct optical contact between the display and the fluorescent plate, and the second being by means of a coupler to couple the light from the fluorescent plate to the passive display. In the case of the direct optical contact, an image is obtained by the shape of the contact. This may take the form of the conventional seven segment character display arrangement, or any other configuration necessary to convey designated information. In the case of the electrochrome display shown in FIG. 2, wherein direct contact of the plate 1 occurs along the entire length of the electrochrome display, light emission must be controlled to occur only in the regions represented by the display segments 6. This is achieved by selecting an electrolyte 9 which is substantially transparent and which has an index of refraction approximately equal to that of the fluorescent plate 1.

In the case of display constructions in which liquids are utilized, and in which the fluorescent plate 1 is a component of the container wall, as shown in FIG. 4, undesired emission of light is prevented by utilization of a layer 12 between the housing 11 and the fluorescent plate 1 which may either be mirrored or colored.

In an embodiment wherein no direct contact is made between the display and the fluorescent plate, the fluorescent plate must be provided with exit windows, such as the elevated regions 5. These elevations 5 may be mirrored on their edges. It is of further advantage if the material comprising the elevations 5 has adhesive properties so that no separate means is necessary to affix the elevations 5 to the fluorescent plate 1. The fluorescent plate 1 should be selected of a fluorescent material emitting light of frequencies which match as close as possible the absorption characteristics of the display in its light absorbing state. Optimum contrast for improved resolution can be achieved if the optically non-contacting regions are covered with a foil layer, which may be colored to match the coloring of the absorbing state of the display. It is also advantageous to color the non-switchable regions of the passive display the same color as the color of the absorbing display state.

As is known in the art, good results are achieved with electrochromic layers comprised of $WO_3$ or $MoO_3$. When a solid electrochrome display is utilized, the display segments may be applied directly upon the fluorescent plate.

In the case of a liquid electrochromic display, the reversible region of the electrochromic display is larger than or at least as large as the optical contact 5, as shown in FIG. 3. This minimizes error due to parallax effects. In order to enlarge the angle for viewing, it is desirable to use contacting elements 5 which are as thin as possible.

It is also possible to substitute a fluorescent plate in place of one of the transparent carriers 3 for use in combination with the electrochrome layer. In this embodiment, best results are achieved when the index of refraction of the electrolyte 9 is approximately equal to that of the fluorescent plate.

Good contrast is achieved if the color of the diffuse scatterer referenced 8 in the drawings is chosen to contrast with the dye utilized in the fluorescent plate. A fluorescent plate can further be utilized in place of the transparent carrier shown in the individual display unit in FIG. 4.

In the embodiment of FIG. 6, contrast can be heightened by choosing a light absorbing color such as black for the liquid and coloring the movable particles 16 in a contrasting color such as white. It is further advantageous to utilize fluorescing pigments as the charged particle 16 to provide a further increase in image intensity.

Similarly, a contrasting color selection can be used with respect to the embodiment of FIG. 5 wherein the inventive concept is utilized in combination with magnetically or electrically oriented dipoles in a liquid. A particularly advantageous passive display of this type is achieved by the use of carbon fibers or other rod-shaped particles such as herapatite suspended in a liquid.

Although modifications and changes may be suggested by those skilled in the art, it is the intention of the inventors to embody within the patent warranted hereon all changes and modifications as reasonably and properly come within the scope of their contribution to the art.

We claim as our invention:

1. A device for the optical display of information with improved sensitivity and intensity comprising:
    a plate consisting of a material with an index of refraction greater than 1 and which contains fluorescent particles for collection of light radiation impinging on said plate by means of fluorescent scattering;
    a passive display having regions controllably switchable between a light absorbing and a light reflective state, said passive display disposed behind said plate in the line of sight of a viewer; and
    a coupling means for coupling selected areas of said plate and said passive display to allow transmission of light in selected patterns to a viewer.

2. The device of claim 1 wherein said coupling means is comprised of at least one element comprised of light conducting material disposed between a switchable region of said display and said plate.

3. The device of claim 1 wherein said plate and said display each have at least one flat surface, and wherein said coupling means comprises a plane containing said flat surfaces with said plate and said display disposed adjacently at said flat surfaces.

4. The device of claim 1 wherein said plate is provided with a light exit window in registry with each switchable region of said display.

5. The device of claim 4 wherein said light exit windows are elevations on the fluorescent plate.

6. The device of claim 5 wherein the edges of said elevations are mirrored.

7. The device of claim 1 wherein the edges of said plate are mirrored.

8. The device of claim 1 wherein said coupling means has adhesive properties for maintaining said display and said plate in joined relation.

9. The device of claim 1 wherein said absorbing state is achieved by selected absorption of light radiation, and wherein said absorption in said display occurs at a frequency substantially equivalent to the frequency of fluorescent emission of said fluorescent particles.

10. The device of claim 1 wherein an opaque foil layer is disposed between said plate and said display, said opaque foil covering only regions not coupled by said coupling means.

11. The device of claim 10 wherein said foil layer has a color absorbing light of substantially the same frequency as the absorbing state of said display.

12. The device of claim 1 wherein regions of said display which are not coupled to said plate are of a color absorbing substantially the same frequencies as said light absorbing state in said display.

13. The device of claim 1 wherein regions of said display which are not switchable are mirrored.

14. The device of claim 1 wherein said display is a solid electrochrome display.

15. The device of claim 1 wherein said display is a liquid electrochrome display.

16. The device of claim 1 wherein a separate display is provided for each switchable region, and wherein said separate displays are attached directly to said plate.

17. The device of claim 15 wherein said coupling means has an area which is less than or equal to the switchable region of the electrochrome display.

18. The device of claim 14 wherein said electrochrome display contains an internal diffuse scatterer, and wherein regions of said diffuse scatterer which are not in registry with the switchable regions of said electrochrome display are of a color which absorbs light of substantially the same frequencies as the absorbing state of the electrochrome display.

19. The device of claim 14 wherein said electrochrome display contains an internal diffuse scatterer, and wherein portions of said scatterer in registry with the switchable regions of said electrochrome display contain fluorescent particles.

20. The device of claim 15 wherein said plate forms a front transparent carrier for the electrochrome display electrodes and wherein the rear carrier of the electrochrome display is transparent.

21. The device of claim 20 wherein said rear carrier of electrochrome display contains fluorescent particles.

22. The device of claim 20 wherein the index of refraction of the electrolyte in the electrochrome display is approximately equal to that of the plate.

23. The device of claim 20 wherein the electrochrome display is provided with an internal diffuse scatterer in registry with switchable regions in the electrochrome display.

24. The device of claim 20 wherein the electrolyte for the electrochrome display is transparent.

25. The device of claim 20 wherein the entire electrochrome display including the front and rear carriers are mirrored on their edges.

26. The device of claim 20 wherein the fluorescent particles in said plate are disposed in a flat region thereof closest to a viewer in the viewer's line of sight and wherein the region containing fluorescent particles is substantially thicker than the remaining region of the plate which does not contain fluorescent particles.

27. The device of claim 26 wherein the fluorescent particles in said plate are disposed in a region having a thickness of 2 mm.

28. The device of claim 20 wherein a fluorescing dye is dissolved in the electrolyte of said electrochrome display.

29. The device of claim 27 wherein an internal diffuse scatterer is provided in said electrochrome display in registry with switchable regions of said display, and wherein said diffuse scatterer is colored with a fluorescing dye absorbing different frequencies than the fluorescing dye dissolved in the electrolyte.

30. The device of claim 1, wherein said display is an electrophoretic display.

31. The device of claim 30 wherein the electrophoretic display is black.

32. The device of claim 30 wherein the electrophoretic particles are colored, e.g. white.

33. The device of claim 32 wherein the electrophoretic particles are fluorescing.

34. The device of claim 1 wherein said display is a magnetic dipole display.

35. The device of claim 34 wherein the magnetic particles are colored.

36. The device of claim 1 wherein said display is a colloid suspension display.

37. The device of claim 36 wherein the colloid suspension is comprised of fibres, e.g. carbon or herapatit.

38. The device of claim 1 wherein said display is a pleochroic dyes containing liquid crystal display.

39. The device of claim 38 wherein said dyes are fluorescing.

40. The device of claim 38 wherein the back-plate of the display is covered with fluorescing particles.

* * * * *